United States Patent [19]

Buchwalter et al.

[11] 4,316,784
[45] Feb. 23, 1982

[54] PROCESS FOR ELECTRODEPOSITION OF MICHAEL ADDUCTS OF POLYMERIC MATERIALS

[75] Inventors: Stephen L. Buchwalter, Allison Park; Joseph F. Bosso, Lower Burrell; Roger M. Christenson, Gibsonia, all of Pa.

[73] Assignee: PPG Industries, Inc., Pittsburgh, Pa.

[21] Appl. No.: 247,582

[22] Filed: Mar. 26, 1981

Related U.S. Application Data

[60] Continuation of Ser. No. 180,742, Aug. 25, 1980, abandoned, which is a division of Ser. No. 937,386, Aug. 28, 1978, Pat. No. 4,248,753.

[51] Int. Cl.³ .............................................. C25D 13/06
[52] U.S. Cl. ................................................. 204/181 C
[58] Field of Search ................................... 204/181 C

[56] References Cited

U.S. PATENT DOCUMENTS

| | | | |
|---|---|---|---|
| 2,576,501 | 11/1951 | Dalton | 260/561 |
| 2,576,502 | 11/1951 | Dalton | 260/89.7 |
| 3,637,597 | 1/1972 | Jalics | 260/65 |
| 3,799,910 | 3/1974 | Shingai et al. | 260/78.5 UA |
| 3,804,786 | 4/1974 | Sekmakas | 260/18 PT |
| 3,844,916 | 10/1974 | Gaske | 204/159.16 |
| 3,914,165 | 10/1975 | Gaske | 204/159.15 |
| 3,975,251 | 8/1976 | McGinniss | 204/181 |
| 4,020,123 | 4/1977 | Trapasso | 260/837 R |
| 4,039,414 | 8/1977 | McGinniss | 204/181 |
| 4,105,518 | 8/1978 | McGinniss | 204/189.14 |

FOREIGN PATENT DOCUMENTS 2753861  6/1978  Fed. Rep. of Germany .

*Primary Examiner*—Howard S. Williams
*Attorney, Agent, or Firm*—William J. Uhl

[57] ABSTRACT

Resinous compositions which are the Michael adducts of primary and/or secondary amines and polymers containing alpha, beta-ethylenically unsaturated moieties in conjugation with carbonyl moieties are disclosed. The compositions are depositable on substrates to form films. The films are amenable to oxidative and aminoplast cures and cure with light color. The compositions are desirable for use in cationic electrodeposition.

13 Claims, No Drawings

PROCESS FOR ELECTRODEPOSITION OF MICHAEL ADDUCTS OF POLYMERIC MATERIALS

This application is a continuation of application Ser. No. 180,742, filed Aug. 25, 1980, now abandoned, which is a division of application Ser. No. 937,386, filed Aug. 28, 1978, now U.S. Pat. No. 4,248,753.

Reference is also made to application Ser. No. 937,368, now U.S. Pat. No. 4,198,331. This application relates to curable resinous compositions containing primary and/or secondary amine groups which are nonvolatile under curing conditions and containing alpha, beta-ethylenically unsaturated moieties in conjunction with carbonyl moieties which are reacted with a primary and/or a secondary amine which are volatile under curing conditions. The compositions are depositable on a substrate to form a film.

Reference is also made to application Ser. No. 77,248, filed Sept. 19, 1979, now U.S. Pat. No. 4,256,560 which relates to a method of cationic electrodeposition employing the resinous compositions disclosed in U.S. Pat. No. 4,198,331.

BACKGROUND OF THE INVENTION

1. Field of the Invention

The present invention relates to curable resinous compositions. More particularly, this invention relates to curable resinous coating compositions in which the resinous binder is the Michael adduct of a polymeric material containing alpha, beta-ethylenically unsaturated moieties in conjugation with carbonyl moieties and a primary and/or a secondary amine.

2. Brief Description of the Prior Art

It is known in the art that resinous materials can be dispersed in water with cationic groups such as quaternary ammonium base groups and amine salt groups. Such resinous materials can be used as binders for water-based coating compositions which can be deposited on substrates by flow, dip, spray and roll coating as well as by cationic electrodeposition. One disadvantage of such cationic systems is the presence of the amino nitrogen which discolors white and pastel coatings, inhibits oxidative cure and gives the coating a basic character which inhibits acid catalyzed cures such as with aminoplast crosslinking agents.

It is therefore an object of the present invention to provide a resinous binder for use in curable coating compositions which in the uncured state contains an amino nitrogen and which loses the nitrogen on curing.

SUMMARY OF THE INVENTION

In accordance with the present invention, a method of electrocoating an electrically conductive surface serving as a cathode which comprises passing electric current between said cathode and an anode immersed in an aqueous dispersion of an electrodepositable heat-curable resinous coating composition is provided.

In one embodiment of the invention, the resinous coating composition is dispersible in aqueous medium with the aid of cationic salt groups and comprises as the resinous binder:

(A) an active hydrogen-containing polymeric material containing alpha, beta-ethylenically unsaturated moieties in conjugation with carbonyl moieties selected from the class consisting of

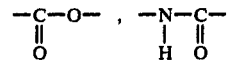

and being substantially free of epoxy functionality reacted under conditions sufficient to form a Michael adduct with (B) a primary and/or secondary amine which has a boiling point below 100° C.;

said reaction product of (A) and (B) being at least partially neutralized with an acid to provide said cationic salt groups and being in combination with a curing agent which is reactive with the active hydrogens at elevated temperatures to form a crosslinked product; said coating composition being electrodepositable on a substrate to form a film thereon.

In another embodiment of the invention, the heat-curable resinous coating composition is dispersible in aqueous medium with the aid of cationic salt groups comprising as the resinous binder:

(A) an active hydrogen-containing polymeric material containing alpha, beta-ethylenically unsaturated moieties in conjugation with

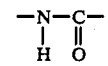

moieties reacted under conditions sufficient to form a Michael adduct with (B) a primary and/or secondary amine which has a boiling point below 100° C.;

said reaction product of (A) and (B) being at least partially neutralized with an acid to provide said cationic salt groups and being in combination with a curing agent which is reactive with the active hydrogens at elevated temperatures to form a crosslinked product; said coating composition being electrodepositable on a substrate to form a film thereon.

PERTINENT PRIOR ART

U.S. Pat. No. 3,975,251 to McGinniss disclosed cationic electrodepositable compositions comprising acid-solubilized polyamine resins in combination with polyacrylate curing agents. Upon electrodeposition, the polyamine resin deprotonates on the cathode, exposing primary or secondary amine groups which react via a Michael addition with the polyacrylate curing agent to form a cured coating. In such compositions, the polyamine resin must be completely neutralized to prevent any premature reaction between the unprotonated polyamine resin and the polyacrylate curing agent in the electrodeposition bath. Complete neutralization is a disadvantage in that it may result in baths with low pH's which can cause corrosion problems. In addition, in the resinous compositions of the McGinniss patent, amine groups are not released on curing and thus the resultant electrodeposited coatings are not readily curable by autooxidation or with amine-aldehyde curing agents.

U.S. Pat. No. 3,637,597 to Jalics discloses water-dispersible polymers containing pendant Mannich adduct units for rendering the polymer dispersible in water. The polymer can be deposited as a film. When the film is heated, the Mannich adduct units decompose leaving a less basic film and unsaturated sites for subsequent curing via vinyl polymerization.

DETAILED DESCRIPTION

The resinous compositions of the present invention comprise a polymeric material which is formed via a Michael-type reaction of a primary and/or secondary amine with a polymeric material containing alpha, beta-ethylenically unsaturated moieties in conjugation with carbonyl moieties, that is,

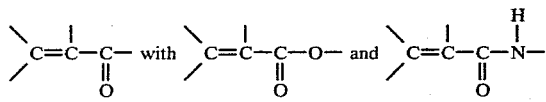

being preferred.

The preferred polymeric materials contains active hydrogens such as those selected from the class consisting of hydroxyl, primary amine, secondary amine (including imine), thiol and carboxylic acid, with hydroxyl being preferred. Such polymeric materials are curable with a crosslinking agent such as an amine-aldehyde condensate or a capped isocyanate. Particularly preferred are polymeric materials which are prepared from epoxy-containing resinous materials. To introduce the alpha, beta-ethylenically unsaturated moieties in conjugation with carbonyl moieties into the polymer, the epoxy-containing resinous materials can be reacted with alpha, beta-ethylenically unsaturated carboxylic acids such as acrylic acid or methacrylic acid or hydroxy-containing epoxy resins can be transetherified with alkoxymethyl containing acrylamides or methacrylamides.

The epoxy-containing resinous materials are polyepoxides, that is, epoxy resins which have a 1,2-epoxy functionality greater than one.

The preferred polyepoxides are polyglycidyl ethers of polyphenols preferably bisphenols such as Bisphenol A. These can be produced, for example, by etherification of polyphenol with epihalohydrin or dihalohydrin such as epichlorohydrin or dichlorohydrin in the presence of alkali. The polyphenol can be, for example, hydroquinone, 2,2-bis-(4-hydroxyphenyl)propane, 1,1-bis-(4-hydroxyphenyl)ethane, 2-methyl-1,1-bis-(4-hydroxyphenyl)propane, 2,2-bis-(4-hydroxy-3-tertiarybutylphenyl)propane, bis-(2-hydroxynaphthyl)methane, 1,5-dihydroxy-3-naphthalene or the like. Also oxyalkylated adducts such as ethylene and propylene oxide adducts of polyphenols may be employed.

Another quite useful class of polyepoxides is produced from novolak resins or similar polyphenol resins.

The polyepoxides such as the preferred polyglycidyl ethers of polyphenols can be further reacted to chain extend and increase their molecular weight. For example, they may be further reacted with active hydrogen-containing materials, which are, of course, different from the polyglycidyl ether of the polyphenols and which are reactive with epoxy groups, such as those containing hydroxyl, thiol, carboxylic acid, primary and secondary amine groups. Preferred chain extenders are organic polyols, preferably polymeric polyols, such as polyester polyols including polylactone polyols. Chain extending of epoxy-containing polymeric materials with polymeric polyols is disclosed in U.S. patent application Ser. No. 788,706, filed Apr. 19, 1977, now U.S. Pat. No. 4,104,147, to Marchetti, Zwack and Jerabek, and assigned to PPG Industries, Inc., the assignee of the present application. The epoxy-containing polymeric materials can also be chain extended with N-heterocyclic-containing materials such as described in U.S. patent application Ser. No. 807,757, filed June 17, 1977, now U.S. Pat. No. 4,110,287, to Bosso and Castellucci and assigned to PPG Industries, Inc., the assignee of the present application.

Besides the polymers mentioned above, other epoxy-containing polymers can be employed although their use is not preferred. Examples include polyglycidyl ethers of polyhydric alcohols, polyglycidyl esters of polycarboxylic acids and epoxy-containing acrylic polymers. These polymers are described in U.S. Pat. No. 4,001,156 to Bosso and Wismer, the portions of which are hereby incorporated by reference.

Besides the adducts of polyepoxides with alpha, beta-ethylenically unsaturated carboxylic acids, examples of other polymeric materials containing alpha, beta-ethylenically unsaturated moieties in conjugation with carbonyl moieties are the transetherification reaction products of polymeric polyols with N-alkoxy-methyl acrylamides and methacrylamides such as N-butoxymethyl acrylamide and N-ethoxymethyl methacrylamide. Examples of polymeric polyols are hydroxyl-containing acrylic resins, polyester polyols including polyesters derived from lactones, polyether polyols and polymeric polyols derived from the epoxy resins described above. Such polymeric polyols would be, for example, the reaction product of the epoxy resins with monoalcohols, phenols or excess polyols to give epoxy-free polyether polyols. It is preferred that the polymeric polyol be epoxy free to avoid subsequent reaction of the epoxy functionality with primary and/or secondary amines. Also, the reaction products of NCO-containing prepolymers with hydroxyalkyl esters of alpha, beta-ethylenically unsaturated carboxylic acids, for example, hydroxyethyl acrylate and hydroxypropyl methacrylate, could be used.

The amount of alpha, beta-ethylenically unsaturated moieties in conjugation with carbonyl moieties should preferably amount to an average of 0.1 to 10, more preferably 0.5 to 5 equivalents of unsaturation per mole of polymeric material.

The amine which is reacted with the polymeric material containing alpha, beta-ethylenically unsaturated carbonyl moieties to form the Michael adduct is a primary or secondary amine which is volatile under curing conditions. When a coating composition containing the polymeric Michael adduct is deposited on a substrate to form a film and the film heated to curing temperatures, the Michael adduct decomposes releasing free amine which volatilizes under curing conditions, that is, at least 25, preferably at least 50, and most preferably at least 80 percent by weight of the amine volatilizes leaving a less basic (or even neutral) film. Examples of primary and secondary amines are those which have a boiling point below 200° C. and examples include ethanolamine, methyl ethanolamine, piperidine and amylamine. Preferred primary and secondary amines are those boiling below 100° C. such as propylamine, diethylamine and dimethylamine.

The conditions under which the amine and the polymeric material containing alpha, beta-ethylenically unsaturated moieties in conjugation with carbonyl moieties are reacted are as follows:

To the stirred mixture of the polymeric material containing alpha, beta-ethylenically unsaturated moieties in conjugation with carbonyl moieties and any desired solvent to reduce viscosity, the amine is added. The reaction temperature can be initially ambient temperature or slightly above (i.e., 50° C.). Cooling may or may not be necessary depending on the exothermic nature of the particular reaction and the scale on which it is conducted. Following amine addition, reaction is carried to completion by heating at 50°–80° C. for 1 to 2 hours.

Secondary amines are preferred to primary amines because of processing conditions. Primary amines are difunctional and have potential for gelling the reaction mixture. If primary amines are used, precautions should be taken to avoid gelling. For example, excess amine can be used and the excess vacuum stripped at the completion of the reaction. Also, the above-described reaction conditions can be varied such that the polymeric material is added to the amine.

The ratio of amine to polymeric material should preferably amount to at least 0.1, more preferably from 0.1 to 1 equivalents of amine to 1 equivalent of alpha, beta-ethylenically unsaturated moieties in conjugation with carbonyl moieties.

The Michael adducts prepared as described above can be made water dispersible. Depending on the structure and molecular weight of the adduct and the concentration of amine groups, the Michael adduct may be dispersible as prepared. However, it is preferred that the adduct contain cationic groups such as amine salt groups to assist in water dispersibility.

Amine salt groups can be obtained by neutralizing the Michael adduct with acid. Examples of suitable acids include organic and inorganic acids such as formic acid, acetic acid, lactic acid, phosphoric acid and carbonic acid. The extent of neutralization will depend on the particular Michael adduct employed. It is only necessary that sufficient acid be added to solubilize or disperse the product in water. Typically, the amount of acid used will be sufficient to provide about 30 to 120 percent of the total theoretical neutralization.

For aqueous-based systems, the concentration of cationic groups, the molecular weight and the structure of the resinous binder should be coordinated with one another such that when the resinous binder is mixed with an aqueous medium, a stable dispersion will form. A stable dispersion is one which does not sediment or is one which is easily redispersible if some sedimentation occurs. In addition, the dispersion should be of sufficient cationic character that the dispersed resin particles will migrate towards the cathode when an electrical potential is impressed between an anode and a cathode immersed in the aqueous dispersion.

Also, the molecular weight, structure and concentration of cationic groups should be controlled so that the dispersed resin will have the required flow to form a film upon the substrate, and in the case of electrodeposition, to form a film on a cathode. The film should be insensitive to moisture. For cationic electrodeposition, it should be insensitive to moisture to the extent that it will not redissolve in the electrodeposition bath or be rinsed away from the coated cathode after its removal from the bath. The structure, molecular weight and concentration of cationic groups are dependent on one another and the selection of one can only be made after a consideration of the other two. For example, because of flow considerations and/or dispersibility, Michael adducts prepared from polyglycidyl ethers of polyphenols should be of lower molecular weight than many of the epoxy-containing acrylic polymers mentioned above. In addition, higher molecular weight polymers usually require a higher concentration of cationic groups than lower molecular weight polymers unless the polymers contain hydrophilic groups such as poly(oxyalkylene) moieties.

In general, most of the Michael adducts useful in the practice of the invention have molecular weights within the range of 500 to 60,000. Water dispersible adducts will usually contain from about 0.01 to 10 milliequivalents of cationic groups per gram of resin solids. With regard to the polymers prepared from the preferred polyglycidyl ethers of the polyphenols, the molecular weight of the preferred polymers will fall within the range of 500 to 10,000, more preferably 1000 to 10,000. For aqueous systems, these preferred polymers will contain from about 0.01 to 8.0 and preferably from about 0.05 to 6.0 milliequivalents of cationic groups per gram of polymer.

The preferred Michael adducts prepared in accordance with the present invention also contain active hydrogens which are reactive at elevated temperatures with a curing agent. Examples of active hydrogens are hydroxyl, thiol, primary amine, secondary amine (including imine) and carboxyl, with hydroxyl being preferred.

The curing agents are those which are capable of reacting with the active hydrogens to form a cross-linked product. Examples of suitable curing agents are phenolic resins, aminoplasts and polyisocyanates. The polyisocyanates should be capped or blocked so that they will not prematurely react with the active hydrogens in the Michael adduct.

The aminoplasts are aldehyde condensation products of melamine, benzoguanamine, urea or similar compounds. Generally, the aldehyde employed is formaldehyde, although useful products can be made from other aldehydes such as acetaldehyde, crotonaldehyde, acrolein, benzaldehyde, furfural and others. Condensation products of melamine, urea or benzoguanamine are most common and are preferred but products of other amines and amides in which at least one amino group is present can also be employed. For exmple, such condensation products can be produced from various diazines, triazoles, guanidines, guanamines and alkyl and di-substituted derivatives of such compounds including alkyl and aryl-substituted ureas and alkyl and aryl-substituted melamines and benzoguanamines. Examples of such compounds are N,N-dimethyl urea, N-phenyl urea, dicyandiamide, formoguanamine, acetoguanamine, 6-methyl-2,4-diamino-1,3,5-triazine, 3,5-diaminotriazole, triaminopyrimidine, 2,4,6-triethyltriamine-1,3,5-triazine and the like.

These amine-aldehyde and amide-aldehyde condensation products contain methylol groups or similar alkylol groups depending upon the particular aldehyde employed. If desired, these methylol groups can be etherified by reaction with an alcohol. Various alcohols are employed for this purpose including essentially any monohydric alcohol, although the preferred alcohols contain from 1 to 4 carbon atoms such as methanol, ethanol, isopropanol and n-butanol.

The aminoplast curing agent usually constitutes about 1 to 60 and preferably 5 to 40 percent by weight of the resinous composition based on total weight of the Michael adduct and aminoplast.

The capped or blocked isocyanates which may be employed in the compositions of the present invention may be any isocyanate where the isocyanato groups have been reacted with a compound so that the resultant capped isocyanate is stable to active hydrogens at room temperature, that is, 20° to 30° C., but reactive with active hydrogens at elevated temperatures, usually between about 90°–200° C.

In the preparation of the capped organic polyisocyanate, any suitable organic polyisocyanate including aliphatic, cycloaliphatic and aromatic polyisocyanates may be used. Examples include tetramethylene diisocyanate, isophorone diisocyanate, 4,4'-dicyclohexyl methane diisocyanate, 2,4- or 2,6-toluene diisocyanate and mixtures thereof. Higher polyisocyanates can be employed such as triisocyanates.

Any suitable aliphatic, cycloaliphatic, aromatic alkyl mono-alcohol and phenolic compound may be used as a capping agent in accordance with the present invention, such as, for example, lower aliphatic alcohols containing from 1 to 4 carbon atoms such as methanol and ethanol; cycloaliphatic alcohols such as cyclohexanol; aromatic alkyl alcohols such as phenyl carbinol. Higher molecular weight, relatively non-volatile mono-alcohols such as 2-ethylhexanol can be used, if desired, to serve as plasticizers in the coating provided by this invention.

Additional capping agents include oximes such as methyl ethyl ketoxime and lactams such as epsilon-caprolactam. Use of oximes and lactams is particularly desirable because the polyisocyanates blocked with these agents unblock and react at relatively low temperatures.

The reaction between the organic polyisocyanate and a capping agent is usually exothermic, therefore, the polyisocyanate and the capping agent are preferably admixed at temperatures of no higher than 80° C. and preferably below 50° C. to minimize the exotherm effect.

The polyisocyanate curing agent can be used in two similar ways. The polyisocyanate can be fully capped, that is, no free isocyanate groups remain, and then combined with the polymeric Michael adduct to form a two-component system. Or, the polyisocyanate can be partially capped, for example, a half-capped diisocyanate so that reactive isocyanate groups remain. The partially capped isocyanate can then be reacted with a portion of the active hydrogens in the polymer molecule under conditions which will not unblock the isocyanate nor gel the reaction mixture. This reaction makes the capped isocyanate integral with the polymer molecule. Whether partially capped or fully capped, sufficient polyisocyanate is present in the coating system so that the equivalent ratio of latent curing capped isocyanate groups to active hydrogens is at least 0.05:1 and preferably about 0.1 to 1:1.

Besides the aminoplast and capped isocyanate curing agents which cure through reaction with the active hydrogens of the polymeric material, unsaturated curing agents which cure through reaction with the alpha, beta-ethylenic unsaturation in the polymer material can be employed. Self-curing systems in which the polymeric material polymerizes with itself through the alpha, beta-ethylenic unsaturation are also possible although curing with additional unsaturated curing agents is preferred. Examples of suitable unsaturated curing agents are vinyl compounds which are non-volatile under curing conditions containing at least one $CH_2=C<$ group. Examples of suitable vinyl compounds are polyol polyacrylates and polyol polymethacrylates which are obtained by esterifying acrylic and methacrylic acid with polyols containing from 2 to 8 carbon atoms such as ethylene glycol, 1,2- and 1,3-propanediol and 1,2-, 1,3- and 1,4-butanediols, diethylene glycol, triethylene glycol, dipropylene glycol, trimethylolpropane and pentaerythritol.

The unsaturated crosslinking agent generally constitutes about 1 to 60 and preferably 2 to 50 percent by weight of the composition based on total weight of the Michael adduct and crosslinking agent.

For aqueous-based systems, the unsaturated crosslinking agent containing acryloyl or methacryloyl groups, can be made cationic in character by reacting with a primary or secondary amine and neutralizing with acid as described generally above.

Autooxidative curing is possible in the practice of the invention. Generally, oxidative curing is not possible with amine group-containing resins since amines inhibit oxidative cure. However, in the present invention, the amine is volatilized. Examples of materials which are capable of oxidative cures are epoxidized polybutadienes reacted with alpha, beta-ethylenically unsaturated carboxylic acids such as acrylic and methacrylic acid. Also, hydroxyl-terminated polybutadienes which are esterified with acrylic or methacrylic acid or reacted with a partially capped diisocyanate such as toluene diisocyanate half-capped with a hydroxyalkyl ester of an alpha, beta-ethylenically unsaturated carboxylic acid such as hydroxyethyl acrylate or hydroxypropyl acrylate can be used. As is conventional with autooxidative curing, metal driers such as heavy metal soaps, for example, cobalt and manganese naphthanate and octoate can be used.

The resinous compositions of the present invention can be used neat, in organic solution or as mentioned above in aqueous dispersions. The term "dispersion" as used within the context of the present invention is believed to be a two-phase, transparent, translucent or opaque aqueous resinous system in which the resin is the dispersed phase and water is the continuous phase. Average particle size diameter of the resinous phase is generally less than 10 and preferably less than 5 microns. The concentration of the resinous phase in the aqueous medium depends upon the particular end use of the dispersion and in general is not critical. For example, the aqueous dispersion preferably contains at least 1 and usually from about 5 to 50 percent by weight resin solids.

Besides water, the aqueous medium may contain a coalescing solvent. The use of coalescing solvent may be, in some instances, for improved film appearance. These solvents include hydrocarbons, alcohols, esters, ethers and ketones. The preferred coalescing solvents include mono-alcohols, glycols and polyols as well as ketones and other alcohols. Specific coalescing solvents include isopropanol, butanol, isophorone, 4-methoxy-2-pentanone, ethylene and propylene glycol, the monoethyl, monobutyl and monohexyl ethers of ethylene glycol and 2-ethylhexanol. The amount of coalescing solvent is not unduly critical and is generally between about 0.01 and 40 percent by weight, preferably about 0.05 to about 25 percent by weight based on total weight of aqueous medium.

In most instances, a pigment composition and, if desired, various additives such as surfactants or wetting agents are included in the dispersion. Pigment composition may be any of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. Pigment content of the dispersion is usually expressed as pigment-to-resin ratio. In the practice of the present invention, the pigment-to-resin ratios are usually within the range of 0.1 to 5:1. The other additives mentioned above are present in the dispersion in amounts of 0.01 to 3 percent by weight based on total weight of resin solids.

When the aqueous dispersions described above are employed for use in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode when sufficient voltage is impressed between the electrodes. The conditions under which electrodeposition is carried out are, in general, similar to those used in electrodeposition of other types of coatings. The applied voltage may be varied and can be, for example, as low as one volt or as high as several thousand volts, but typically between 50 and 500 volts. The current density is usually between 1.0 ampere and 15 amperes per square foot and tends to decrease during electrodeposition indicating the formation of an insulating film.

The curable resinous compositions of the present invention can also be used in other conventional coating applications such as flow, dip, spray and roll coating.

For electrodeposition and other conventional coating applications, the coating compositions can be applied to a variety of electroconductive substrates especially metals such as steel, aluminum, copper, magnesium and the like, but also include metallized plastic and conductive carbon-coated materials. For other conventional coating applications, the compositions can be applied to non-metallic substrates such as glass, wood and plastic.

After the coating has been applied, it is usually cured by baking at elevated temperatures such as 90° to 210° C. for about 1 to 30 minutes.

Illustrating the invention are the following examples, which, however, are not to be construed as limiting the invention to their details. All parts and percentages in the examples as well as throughout this specification are by weight unless otherwise indicated.

EXAMPLE I

An epoxy resin, a polyglycidyl ether of Bisphenol A chain extended with poly(neopentyl glycol-adipate) diol, was reacted with acrylic acid to form a polymeric material containing alpha, beta-ethylenically unsaturated carbonyl moieties. The Michael adduct was prepared by reacting this polymeric material with dimethylamine.

The reaction product was prepared from the following charge:

| Ingredient | Parts by Weight | Solids |
|---|---|---|
| EPON 829[1] | 1389.6 | 1333.3 |
| Bisphenol A | 448.6 | 448.6 |
| poly(neopentyl glycol-adipate) diol (MW = 530) | 380.0 | 365.0 |
| TEXANOL[2] | 178.0 | |
| benzyl dimethylamine (catalyst) | 6.2 | 6.2 |
| 88% aqueous lactic acid | 7.2 | 6.3 |
| phenyl CELLOSOLVE[3] | 462.0 | |
| methyl ethyl ketone | 365.0 | |
| FOAMKILL 639[4] | 12.0 | 12.0 |
| phenothiazine (free radical inhibitor) | 0.2 | 0.2 |

| Ingredient | Parts by Weight | Solids |
|---|---|---|
| IONOL[5] (free radical inhibitor) | 10.9 | 10.9 |
| acrylic acid | 119.5 | 119.5 |
| triphenyl phosphine | 23.0 | 23.0 |
| 40% by weight aqueous dimethylamine | 157.8 | 63.2 |
| methyl ethyl ketone | 250.0 | |

[1]Polyglycidyl ether of Bisphenol A having a molecular weight of about 380 and an epoxy equivalent weight of about 190 commercially available from Shell Chemical Company.
[2]2,2,4-trimethylpentan-1,3-diol monoisobutyrate commercially available from Eastman Chemical Company.
[3]Ethylene glycol monophenyl ether.
[4]A hydrocarbon oil-containing inert diatomaceous earth commercially available from Crucible Chemical Company.
[5]2,6-ditertiarybutyl-4-methyl phenol commercially available from Shell Chemical Company.

The EPON 829 and Bisphenol A were charged to a reaction vessel under a nitrogen atmosphere and heated to 150° C. to initiate an exotherm. Following the exotherm, the temperature was maintained at 150° C. for 1 hour. The reaction mixture was then cooled to 135° C. followed by the addition of the poly(neopentyl glycol-adipate) diol, TEXANOL and benzyl dimethylamine. The temperature of the reaction mixture was held at about 135° C. until its Gardner-Holdt viscosity measured as a 1:1 mixture with ethylene glycol monoethyl ether was U+. The lactic acid was then added to neutralize the benzyl dimethylamine catalyst and the reaction mixture thinned with the phenyl CELLOSOLVE. The FOAMKILL 639 dissolved in the methyl ethyl ketone was then added followed by the addition of the phenothiazine and IONOL. After addition of the acrylic acid, the nitrogen atmosphere was removed and air was sparged through the reaction mixture. The triphenyl phosphine was added and the reaction mixture heated to 100° C. and held at this temperature for about 6 hours. The temperature was lowered to about 80° C., the aqueous dimethylamine solution was added dropwise and the reaction mixture held at about 80° C. for 2 hours. The reaction mixture was then thinned with the methyl ethyl ketone. The resin contained 66.3 percent total solids (at 105° C.) and contained 0.397 milliequivalents of total base per gram of resin solids.

EXAMPLE II

The Michael adduct of Example I was combined with an amine-aldehyde crosslinker (CYMEL 1156) at a level of 20 percent on total solids for use as a solvent-based coating composition. The coating composition was prepared from the following charge:

| Ingredient | Parts by Weight |
|---|---|
| Michael adduct of Example I (66.3% total solids) | 100.0 |
| CYMEL 1156[1] | 15.8 |
| methyl ethyl ketone | 42.0 |

[1]Butylated melamine-formaldehyde condensate commercially available from American Cyanamid Company (100 percent solids).

The Michael adduct, CYMEL 1156 and methyl ethyl ketone were mixed together in a stainless steel beaker at room temperature. The mixture was coated onto an untreated steel substrate by drawing down with a 10 mil drawbar. The coating was baked for 30 minutes at 350° F. (177° C.) to form a light-in-color, solvent-resistant, non-tacky film having a thickness of about 0.3–0.5 mil. Solvent resistance was determined by taking an acetonesaturated cloth and rubbing with normal hand pressure back and forth across the film surface. Fifty (50) acetone double rubs removed the film from the substrate.

When the coating composition was applied as described above but baked at 400° F. (204° C.) for 30 minutes, the acetone resistance of the film improved in that 100 acetone double rubs were required to remove the film from the substrate.

EXAMPLE III

The Michael adduct of Example I was combined with CYMEL 1156 at a level of 20 percent on total solids. The mixture was partly neutralized with lactic acid and dispersed in water for evaluation as an electrocoating composition. The charge for preparing the electrodeposition bath at 15 percent by weight of the total resin solids was as follows:

| Ingredient | Parts by Weight |
| --- | --- |
| Michael adduct of Example I | 285.3 |
| CYMEL 1156 | 45.0 |
| 88% by weight aqueous lactic acid | 8.0 |
| deionized water | 1208.4 |

The resin of Example I, CYMEL 1156 and lactic acid were digested for about 15 minutes with stirring in a stainless steel beaker at room temperature. The deionized water was added slowly to the mixture to disperse the resin. The dispersion had a pH of 5.2.

Untreated steel, iron phosphated and galvanized steel panels were electrodeposited in this dispersion at 250 volts for 90 seconds to produce insulating films with excellent appearance and adhesion to the various substrates. When baked at 400° F. (204° C.) for 30 minutes, films having a thickness of about 0.3 to 0.7 mil were obtained which were slightly yellow, hard, with excellent acetone resistance, that is, 100 acetone double rubs only slightly softened the films.

When a second set of panels were electrodeposited in the bath under the same conditions but cured at 350° F. (177° C.) for 30 minutes, films which were lighter in color although somewhat soft and tacky resulted. Fifty (50) acetone double rubs were required to remove the film from the untreated steel and iron phosphated substrates and 15 acetone double rubs were required to remove the film from the galvanized steel substrate.

An aqueous dispersion similar to Example III was prepared but with 15 percent by weight CYMEL 1156 instead of the 20 percent used in Example III. Untreated and zinc phosphated steel panels were cathodically electrodeposited in the dispersion at 150 volts for 90 seconds to produce insulating films with excellent appearance and adhesion to the various substrates. When baked at 375° F. (190° C.) for 30 minutes, hard, solvent-resistant films having a thickness of 1.5 mils on untreated steel and 0.15 mil on zinc phosphated steel were obtained. The film on untreated steel had a pencil hardness of H and 100 acetone double rubs removed the film. The film on zinc phosphated steel had a pencil hardness of H and 30 acetone double rubs removed the film.

EXAMPLE IV

The Michael adduct of Example I was combined with a capped isocyanate crosslinker in the following charge and evaluated as a solvent-based coating composition.

| Ingredient | Parts by Weight |
| --- | --- |
| Michael adduct of Example I | 285.3 |
| capped isocyanate crosslinker[1] (75 percent solids in ethylene glycol monoethyl ether) | 60.0 |

[1]Capped isocyanate crosslinker was formed from reacting one mole of trimethylolpropane with 3 moles of the 2-ethylhexanol monourethane of tolylene diisocyanate.

The Michael adduct and capped isocyanate crosslinker were digested for about 15 minutes with stirring at room temperature in a stainless steel beaker. The mixture was then coated onto a substrate by drawing down with a 10 mil drawbar. The resulting coating was baked at 350° F. (177° C.) for 30 minutes to give a smooth, somewhat soft film.

About two parts by weight of dibutyltin oxide catalyst was added to the coating composition along with 25 parts by weight of water. When the composition was coated over untreated steel substrates by drawing down with a 10 mil drawbar and curing at 400° F. (204° C.) for 30 minutes, a hard, solvent-resistant film having a thickness of about 1.0 mil was obtained. One hundred (100) acetone double rubs barely affected the film. Baking at 350° F. (177° C.) for 30 minutes also resulted in a hard, solvent-resistant film having a thickness of about 1.4 mils. One hundred (100) acetone double rubs partially removed the film.

EXAMPLE V

To the dibutyltin oxide-containing composition prepared as described above was added 8 parts by weight of 88 percent by weight lactic acid and 220 parts by weight of deionized water with stirring and heating at room temperature for 15 minutes to form an aqueous cationic resinous dispersion.

Iron phosphated and untreated steel panels were dipped in this aqueous dispersion and the coated panels baked at 350° F. (177° C.) for 30 minutes. The baked films were dark yellow and smooth having good hardness and gloss. The film had a thickness of about 1.4 mils and 100 acetone double rubs partially removed the films.

An electrodeposition bath was prepared by thinning the dibutyltin oxide-containing dispersion described above with deionized water to about 15 percent by weight total resin solids. The dispersion was excellent and had a pH of about 5.4. When untreated steel, iron phosphated and galvanized steel panels were electrodeposited in the bath at 250 volts (for untreated steel) and 300 volts (for iron phosphated and galvanized steel) for 90 seconds, insulating films with excellent appearance and adhesion to the various substrates were obtained. When the films were baked at 350° F. (177° C.) for 30 minutes, films having a thickness of about 0.5 mil being light in color, glossy, hard, with excellent solvent resistance were obtained. One hundred (100) acetone double rubs slightly softened the films.

When the films were baked at 400° F. (204° C.) for 30 minutes, hard, glossy films being slightly yellow-green in color were obtained and in which 100 acetone double rubs barely affected the film appearance.

EXAMPLE VI

A polyepoxide (polyglycidyl ether of Bisphenol A) was defunctionalized with trimethylolpropane. The resulting polymeric polyol was reacted with N-butoxymethylacrylamide to form a polymeric material containing alpha, beta-ethylenically unsaturated carbonyl moieties. The Michael adduct was prepared by reacting this polymeric material with dimethylamine. The charge for preparing the reaction product was as follows:

| Ingredient | Solids | Parts by Weight |
| --- | --- | --- |
| EPON 829 | 859.0 | 895.0 |
| Bisphenol A | 289.0 | 289.0 |
| trimethylolpropane | 215.0 | 215.0 |
| stannous chloride (catalyst) | 2.5 | 2.5 |
| dibenzyl ether | | 50.0 |
| N-butoxymethylacrylamide | 400.0 | 400.0 |
| hydroquinone (free radical inhibitor) dissolved in phenyl CELLOSOLVE | 8.0 | 19.4 |
| para-toluenesulfonic acid (transetherification catalyst) dissolved in phenyl CELLOSOLVE | 4.8 | 11.7 |
| phenothiazine | 0.1 | 0.1 |
| aqueous dimethylamine | 97.8 | 244.6 |
| phenyl CELLOSOLVE | | 200.0 |
| methyl ethyl ketone | | 150.0 |

The EPON 829 and Bisphenol A were charged into a reaction vessel under a nitrogen atmosphere and heated to 150° C. to initiate an exotherm. Following the 20-minute exotherm, the reaction mixture was held for about one hour at 150° C. This material was then added over 15 minutes to a mixture of trimethylolpropane and stannous chloride which had been heated under nitrogen to 200° C. The resin was then heated at 190° C. for two hours, cooled to 150° C. and then thinned with dibenzyl ether. At 135° C., the N-butoxymethylacrylamide, phenothiazine and solutions of hydroquinone and para-toluenesulfonic acid were added. The stirred mixture was held at 120°–135° C. for 40 minutes during which time the pressure was gradually reduced to approximately 6 torr and 195 parts of n-butanol was distilled off. The evacuated reaction vessel was returned to atmospheric pressure with nitrogen and the mixture was thinned immediately with phenyl CELLOSOLVE then with methyl ethyl ketone after cooling to 100° C. When the resin had cooled to 80° C., aqueous dimethylamine was added over 30 minutes. Finally, the mixture was stirred at 80° C. for two hours to complete the preparation.

EXAMPLE VII

The Michael adduct of Example VI was neutralized with lactic acid and dispersed in deionized water to form a 32.4 percent by weight aqueous dispersion. The charge for preparing the aqueous dispersion was as follows:

| Ingredient | Parts by Weight |
| --- | --- |
| Michael adduct of Example VI (73.7% Resin Solids) | 244.2 |
| 88% aqueous lactic acid | 22.5 |
| deionized water | 350 |

Untreated and zinc phosphated steel panels were dipped into this aqueous dispersion, removed and the dip coatings baked at 400° F. (204° C.) for 30 minutes to form a solvent-resistant, hard, smooth, dark film of approximately 3 mils thickness. One hundred (100) acetone double rubs slightly softened the film.

EXAMPLE VIII

The aqueous dispersion of Example VII was thinned with deionized water to form a 10 percent resin solids electrodeposition bath.

The dispersion had a pH of 6.6. Both untreated steel and zinc phosphated steel panels were cathodically electrodeposited in the dispersion at 150 volts for 90 seconds to produce insulating films. The appearance of the films was good and adhesion to the substrate was excellent. When the films were baked at 450° F. (232° C.) for 30 minutes, light-colored, hard films were obtained. The film build over the untreated steel panels was 0.6 mil, whereas over the zinc phosphated panels, it was 0.3 mil.

When baking was conducted at 400° F. (204° C.) for 30 minutes, light, non-tacky films resulted which were, however, somewhat soft.

EXAMPLE IX

The Michael adduct of Example VI was thinned with methyl ethyl ketone to form an organic solvent-based coating composition. The charge for preparing the coating composition was as follows:

| Ingredient | Parts by Weight |
| --- | --- |
| Michael adduct of Example VI | 100.0 |
| methyl ethyl ketone | 47.4 |

The coating composition prepared as described above was coated onto an untreated steel substrate by drawing down with a 20 mil drawbar. When the coating was baked at 400° F. (204° C.) for 30 minutes, a dark, non-tacky, somewhat soft film of about 1.6 mils was obtained. Seventy (70) acetone double rubs were required to remove the film.

EXAMPLE X

The Michael adduct of Example VI was mixed with CYMEL 1156 at a level of 20 percent on total solids, partly neutralized with lactic acid to 85 pecent of total neutralization, and dispersed in deionized water to form an aqueous coating composition. The charge for preparing the composition was as follows:

| Ingredient | Parts by Weight |
| --- | --- |
| Michael adduct of Example VI | 244.2 |
| CYMEL 1156 | 45.0 |
| 88% aqueous lactic acid | 22.5 |
| deionized water | 350.0 |

Untreated steel and zinc phosphated steel panels were dipped in the bath, removed and baked at 400° F. (204° C.) for 30 minutes to form hard, solvent-resistant films (0.8 mil over untreated steel and 0.4 mil over zinc phosphated steel). One hundred (100) acetone double rubs did not affect the films.

When the coatings were baked at 350° F. (177° C.) for 30 minutes, the baked films (about 1.7 mils over untreated steel and about 2.0 mils over the zinc phosphated steel) were hard and acetone resistant in that 100 acetone double rubs were required to slightly soften the films.

EXAMPLE XI

The Michael adduct of Example VI was combined with CYMEL 1156 at a level of 15 percent on total solids, partly neutralized with lactic acid, and dispersed in deionized water to form an aqueous electrodeposition bath. The charge for preparing the bath was as follows:

| Ingredient | Parts by Weight |
| --- | --- |
| Michael adduct of Example VI | 244.2 |
| CYMEL 1156 | 31.8 |
| 88% aqueous lactic acid | 22.5 |
| deionized water | 2017.5 |

The dispersion was excellent and had a pH of 7.0. Both untreated steel and zinc phosphated steel panels were electrodeposited in the bath at 150 volts (for untreated steel) and 200 volts (for zinc phosphated steel) for 90 seconds to produce insulating films. The appearance of the films was good and the adhesion to the substrate was excellent. When the wet films were baked at 375° F. (191° C.) for 30 minutes, hard, light-colored, glossy, solvent-resistant films were obtained. One hundred (100) acetone double rubs only slightly softened the film.

When the example was repeated and the CYMEL 1156 concentration raised to 20 percent by weight, insulating films were obtained which had excellent appearance and excellent adhesion to the substrate. When the wet films were baked at 350° F. (177° C.) for 30 minutes, baked films (1.3 mils on untreated steel and 0.5 mil on zinc phosphated steel) which were light in color, soft and somewhat tacky were obtained. However, the solvent resistance of the films was excellent in that 100 acetone double rubs only slightly softened the film. When the baking temperature was raised to 400° F. (204° C.) for 30 minutes, the baked films (0.9 mil for untreated steel and 0.5 mil for zinc phosphated steel) were light in color, hard, glossy, smooth and solvent-resistant. One hundred (100) acetone double rubs did not affect the films.

EXAMPLE XII

The Michael adduct of Example VI was combined with the capped isocyanate crosslinker (see Example IV) at a level of 20 percent on total solids, partly neutralized with lactic acid, and dispersed in deionized water to form an aqueous coating composition. The charge for preparing the composition was as follows:

| Ingredient | Parts by Weight |
| --- | --- |
| Michael adduct of Example VI | 244.2 |
| capped isocyanate crosslinker of Example IV (75% resin solids) | 60.0 |
| 88% by weight aqueous lactic acid | 22.5 |
| deionized water | 350.0 |
| dibutyltin dilaurate | 2.9 |

Untreated steel and zinc phosphated steel panels were dipped in the aqueous dispersion, removed and baked at 350° F. (177° C.) for 30 minutes. The baked film (about 2.5 mils) was brown, smooth, glossy, hard and solvent-resistant in that 100 acetone double rubs only slightly softened the film. When baking was conducted at 400° F. (204° C.) for 30 minutes, similar films were obtained but which were more solvent-resistant in that 100 acetone double rubs did not affect the film appearance.

EXAMPLE XIII

The aqueous dispersion of Example XII was thinned with additional deionized water to form a 10 percent resin solids electrodeposition bath. The dispersion was excellent and had a pH of 6.6. Untreated steel and zinc phosphated steel panels were cathodically electrodeposited in this bath at 100 volts for 30 seconds to form insulating films having a fair appearance and excellent adhesion to the substrate. When the films were baked at 350° F. (177° C.) for 30 minutes, baked films of about 1.0 mil in thickness were obtained which were yellowish in appearance, smooth, glossy, hard and solvent-resistant in that 100 acetone double rubs only slightly softened the film.

When the wet films were baked at 400° F. (204° C.) for 30 minutes, the acetone resistance of the film was enhanced in that 100 acetone double rubs did not affect the film appearance.

EXAMPLE XIV

A Michael adduct prepared as generally described in Example VI was combined with a butylated urea-formaldehyde condensate at a level of 30 percent on total solids, partly neutralized with lactic acid and dispersed in deionized water to form an electrodeposition bath. The charge for preparing the bath was as follows:

| Ingredient | Parts by Weight |
| --- | --- |
| Michael adduct of Example VI (74.5% resin solids) | 188 |
| butylated urea-formaldehyde condensate[1] (100% total solids) | 60 |
| 88% by weight aqueous lactic acid | 14.0 |
| deionized water | 1740 |

[1]Commercially available from American Cyanamid Company as BEETLE 80.

Untreated, zinc phosphated and galvanized steel panels were electrocoated in the bath at 250 volts for 90 seconds to form insulating films having good appearance and good adhesion to the metal substrate. Films baked at 328° F. (165° C.) for 30 minutes were hard and required 40 acetone double rubs to remove the film. A slightly higher bake, 347° F. (175° C.) for 30 minutes, led to increased solvent resistance. Eighty (80) to 100 double rubs were required to remove the film. Film thickness in all cases was 0.6–0.8 mil. All films were essentially colorless.

EXAMPLE XV

The Michael adduct of Example VI was neutralized with lactic acid and dispersed in deionized water to form a 10 percent resin solids electrodeposition bath. The charge for forming the bath was as follows:

| Ingredient | Parts by Weight |
| --- | --- |
| Michael adduct of Example VI | 285.3 |
| 88% by weight aqueous lactic acid solution | 8.0 |
| deionized water | 1576.7 |

The dispersion was good and had a pH of 4.6. Untreated and zinc phosphated steel panels were electrodeposited in this bath at 200 volts for 90 seconds to form insulating films. The appearance of the wet films was good and adhesion to the substrate was excellent. When the films were baked at 400° F. (204° C.) for 30 minutes, film builds of 1.0 mil developed on the untreated steel panels and 0.4 mil developed on the zinc phosphated steel panels. The films were slightly dark, smooth and tack-free although acetone easily removed the films from the surface of the panels. When the films were baked at 450° F. (232° C.) for 30 minutes, film builds of 0.5 mil developed on the untreated steel panels and film builds of less than 0.1 mil developed on the zinc phosphated steel panels. The coatings were smooth, somewhat dark in color and tack-free. The coatings on the untreated steel panels were somewhat solvent-resistant in that 30 acetone double rubs were required to remove the films from the surfaces. The film builds on the zinc phosphated steel panels were too thin to measure acetone resistance.

EXAMPLE XVI

An epoxy resin, a polyglycidyl ether of Bisphenol A chain extended with poly(neopentyl glycol-adipate) diol, was reacted with acrylic acid to form a polymer containing alpha, beta-ethylenically unsaturated carbonyl moieties. The Michael adduct was prepared by reacting this polymer with dimethylamine. The charge was as follows:

| Ingredient | Parts by Weight | Solids |
|---|---|---|
| EPON 829 | 1389.6 | 1333.3 |
| Bisphenol A | 448.6 | 448.6 |
| poly(neopentyl glycol-adipate) diol (MW = 530) | 380 | 365 |
| TEXANOL | 178 | — |
| benzyl dimethyl amine | 6.2 | 6.2 |
| lactic acid | 7.2 | 6.3 |
| phenyl CELLOSOLVE | 462 | — |
| FOAMKILL 639 | 12.0 | 12.0 |
| methyl ethyl ketone | 365 | — |
| phenothiazine | 0.22 | 0.22 |
| IONOL | 10.9 | 10.9 |
| acrylic acid | 119.5 | 19.5 |
| triphenyl phosphine | 23.0 | 23.0 |
| 40% by weight aqueous dimethylamine | 217.4 | 86.8 |
| methyl ethyl ketone | 400 | — |

Following the procedure of Example I, a chain-extended epoxy resin was obtained having a Gardner-Holdt viscosity of S at 25° C. as a 1:1 mixture with ethylene glycol monoethyl ether. This material was reduced with solvent and reacted further with acrylic acid and then dimethylamine as in Example I. The Michael adduct resin had a final solids of 60.8 percent.

The Michael adduct was added to a stainless steel beaker containing deionized water and sufficient lactic acid to neutralize 85 percent of the amine functionality. Additional water was then added to reduce the dispersion to 10 percent solids. The charge for preparing the dispersion was as follows:

| Ingredient | Parts by Weight |
|---|---|
| deionized water | 338 |
| 88% by weight aqueous lactic acid | 12.1 |
| Michael adduct | 329 |
| deionized water | 1333 |

The resin dispersed in an excellent fashion and had a pH of 4.2. Untreated steel panels were electrodeposited in the bath at 300 volts for 90 seconds to produce insulating films. Some of the coated panels were air dried, some were baked at 250° F. (121° C.) for 30 minutes, some were baked at 300° F. (149° C.) for 30 minutes, some were baked at 350° F. (177° C.) for 30 minutes, and some were baked at 400° F. (204° C.) for 30 minutes. The air dried and baked films were then scraped from the panels and analyzed for the percentage by weight nitrogen by a Kjeldahl analysis. The results are presented below.

| Drying or Baking Conditions | Percent Nitrogen |
|---|---|
| Air drying | 0.20 |
| 250° F. (121° C.) bake | 0.07 |
| 300° F. (149° C.) bake | no nitrogen detected |
| 350° F. (177° C.) bake | no nitrogen detected |
| 400° F. (204° C.) bake | no nitrogen detected |

COMPARATIVE EXAMPLE XVIa

For the purposes of comparison, a resin similar to that of Example XVI was prepared but one in which the nitrogen was not incorporated into the polymer via a Michael addition. Instead, an epoxy-containing resinous material was reacted with dimethyl amine to incorporate the nitrogen into the polymer through an amine-epoxy reaction. The charge for preparing the reaction product was as follows:

| Ingredient | Parts by Weight | Solids |
|---|---|---|
| EPON 829 | 1390 | 1333 |
| Bisphenol A | 449 | 449 |
| poly(neopentylglycol-adipate) diol (MW = 530) | 380 | 365 |
| TEXANOL | 178 | — |
| benzyl dimethyl amine | 6.2 | 6.2 |
| 88% by weight aqueous lactic acid | 7.1 | 6.2 |
| phenyl CELLOSOLVE | 462 | — |
| FOAMKILL 639 | 12.0 | 12.0 |
| methyl ethyl ketone | 365 | — |
| 40% by weight aqueous dimethylamine | 415.8 | 166.4 |

Following the procedure of Example I, a chain-extended epoxy resin was obtained having a Gardner-Holdt viscosity of U at 25° C. as a 1:1 mixture with ethylene glycol monoethyl ether. After addition of lactic acid, FOAMKILL 639 and solvents as in Example I, the resin was cooled to 45° C. before the dimethylamine was added. The resin was then heated to 70° C. and held there for 1½ hours. Excess amine was then removed by distilling off 200 parts of solvent.

The resin was neutralized with lactic acid and dispersed in deionized water as generally described in Example XVI to form a 10 percent solids electrodeposition bath. The dispersion appeared excellent and had a pH of 4.9.

Untreated steel panels were electrodeposited in the dispersion at 150 volts for 90 seconds to form insulating films. Some of the coated panels were air dried, some baked at 250° F. (121° C.) for 30 minutes, some baked at 300° F. (149° C.) for 30 minutes, some at 350° F. (177° C.) for 30 minutes, and some at 400° F. (204° C.) for 30 minutes. The air dried and baked films were then scraped from the panels and submitted for a nitrogen analysis as described in Example XVI. The results of the analysis were as follows:

| Drying or Baking Conditions | Percent Nitrogen |
|---|---|
| Air dry | 0.73 |

-continued

| Drying or Baking Conditions | Percent Nitrogen |
|---|---|
| 250° F. (121° C.) | 0.78 |
| 300° F. (149° C.) | 0.89 |
| 350° F. (177° C.) | 0.86 |
| 400° F. (204° C.) | 0.51 |

It was noticed in the comparative testing that the baked films of Example XVI were decidedly lighter in color than those of comparative Example XVIa.

COMPARATIVE EXAMPLE XVII

For the purpose of comparison, aqueous electrodeposition baths similar to those of Examples III and XI were prepared but in which the nitrogen was not incorporated into the polymer via a Michael addition. Instead, an epoxy-containing resinous material was reacted with secondary amine to incorporate the nitrogen into the polymer through an amine-epoxy reaction. The baths contained 10 resin solids of which 15 percent was aminoplast (CYMEL 1156). The charge for preparing the polymer was as follows:

| Ingredient | Parts by Weight |
|---|---|
| EPON 828 | 4036 |
| PCP 0200[1] | 1407 |
| xylene | 351 |
| Bisphenol A | 1224 |
| benzyldimethylamine | 8.5 |
| benzyldimethylamine | 14.9 |
| ethylene glycol monoethyl ether | 1231 |
| diethylenetriamine diketimine[2] | 396 |
| methylethanolamine | 317 |

[1] A polycaprolactonediol (molecular weight 530) commercially available from Union Carbide.
[2] Condensation product of one mole of diethylenetriamine and two moles of methyl isobutyl ketone in excess methyl isobutyl ketone (73 percent by weight solids).

The EPON 828, PCP 0200 and xylene were heated to reflux in a reaction vessel equipped with a nitrogen sparge tube and a Dean-Stark trap to collect water. After one-half hour of reflux, the mixture was cooled from 200° C. to 150° C. and the Bisphenol A and first portion of benzyldimethylamine were added. Heating was discontinued as the mixture exothermed for 10-20 minutes. The mixture was then cooled to 130° C. and the second portion of benzyldimethylamine was added. The mixture was then stirred at 130° C. until a Gardner-Holdt viscosity of a 1:1 mixture with ethylene glycol monoethyl ether reached N (two hours). The ethylene glycol monoethyl ether was then added to the resin along with the amines. The reaction was completed by holding the mixture at 110° C. for one hour.

The epoxy-amine adduct prepared as described immediately above was combined with CYMEL 1156, neutralized with acetic acid and dispersed in deionized water in the following charge to form a 10 percent resin solids electrodeposition bath containing 15 percent by weight aminoplast crosslinker.

| Ingredient | Solids | Parts by Weight |
|---|---|---|
| epoxy-amine adduct | 170.0 | 215.0 |
| CYMEL 1156 | 30.0 | 30.0 |
| acetic acid | 2.17 | 2.17 |
| deionized water | — | 1775.0 |

Zinc phosphated steel panels were cathodically electrodeposited in this bath at 200 volts for 90 seconds and the wet films baked under the conditions shown in the table below. The films were then evaluated for hardness, acetone resistance and color, and compared to films electrodeposited from the baths of Examples III and XI.

TABLE

| Example No. | Baking Temperature | Acetone Resistance | Hardness | Color |
|---|---|---|---|---|
| III | 375° F. (191° C.)/30 minutes | 100 | non-scratchable | very light yellow |
| XI | 375° F. (191° C.)/30 minutes | 100 | non-scratchable | very light yellow |
| XVII | 375° F. (191° C.)/30 minutes | 29 | scratchable and tacky | yellow |
| III | 400° F. (204° C.)/30 minutes | 100 | non-scratchable | very light yellow |
| XI | 400° F. (204° C.)/30 minutes | 100 | non-scratchable | very light yellow |
| XVII | 400° F. (204° C.)/30 minutes | 100 | non-scratchable | brown |
| XVII | 425° F. (215° C.)/30 minutes | 100 | non-scratchable | brown |
| XVII | 450° F. (232° C.)/30 minutes | 100 | non-scratchable | dark brown |

The acetone resistance is measured by the number of double rubs required to remove the film with 100 double rubs being the upper limit.
Hardness was determined by whether the coating could be scratched with a fingernail.

We claim:

1. A method of electrocoating an electrically conductive surface serving as a cathode which comprises passing electric current between said cathode and an anode immersed in an aqueous dispersion of an electrodepositable, heat-curable resinous coating composition which is dispersible in aqueous medium with the aid of cationic salt groups comprising as a resinous binder:

(A) an active hydrogen-containing polymeric material containing alpha, beta-ethylenically unsaturated moieties in conjugation with carbonyl moieties selected from the class consisting of

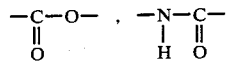

and being substantially free of epoxy functionality reacted under conditions sufficient to form a Michael adduct with (B) a primary and/or secondary amine which has a boiling point below 100° C.;

said reaction product of (A) and (B) being at least partially neutralized with an acid to provide said cationic salt groups and being in combination with a curing agent which is reactive with the active hydrogens at elevated temperatures to form a crosslinked product; said coating composition being electrodepositable on a substrate to form a film thereon.

2. The method of claim 1 in which the cationic salt groups are amine salt groups.

3. The method of claim 1 in which the polymeric material (A) is formed from reacting an epoxy resin with acrylic acid or methacrylic acid.

4. The method of claim 1 in which the polymeric material (A) is formed from reacting a polymeric polyol with an N-alkoxymethyl-containing acrylamide or methacrylamide.

5. The method of claim 4 in which the polymeric polyol is derived from an epoxy resin.

6. The method of claim 1 in which the polymeric material (A) contains active hydrogens selected from the class consisting of hydroxyl, thiol, primary amino and secondary amino.

7. The method of claim 1 in which the curing agent is selected from the class consisting of aminoplasts and capped isocyanates.

8. A method of electrocoating an electrically conductive surface serving as a cathode which comprises passing electric current between said cathode and an anode immersed in an aqueous dispersion of an electrodepositable, heat-curable resinous coating composition which is dispersible in aqueous medium with the aid of cationic salt groups, comprising as a resinous binder:

(A) an active hydrogen-containing polymeric material containing alpha, beta-ethylenically unsaturated moieties in conjugation with

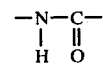

moieties reacted under conditions sufficient to form a Michael adduct with (B) a primary and/or secondary amine which has a boiling point below 100° C.;

said reaction product of (A) and (B) being at least partially neutralized with an acid to provide said cationic salt groups and being in combination with a curing agent which is reactive with the active hydrogens at elevated temperatures to form a crosslinked product; said coating composition being electrodepositable on a substrate to form a film thereon.

9. The method of claim 8 in which the cationic salt groups are amine salt groups.

10. The method of claim 8 in which the polymeric material (A) is formed from reacting a polymeric polyol with an N-alkoxymethyl-containing acrylamide or methacrylamide.

11. The method of claim 10 in which the polymeric polyol is derived from an epoxy resin.

12. The method of claim 8 in which the polymeric material (A) contains active hydrogens selected from the class consisting of hydroxyl, thiol, primary amino and secondary amino.

13. The method of claim 8 in which the curing agent is selected from the class consisting of aminoplast and capped isocyanates.

* * * * *

UNITED STATES PATENT AND TRADEMARK OFFICE
CERTIFICATE OF CORRECTION

PATENT NO. : 4,316,784

DATED : February 23, 1982

INVENTOR(S) : Stephen L. Buchwalter et al

It is certified that error appears in the above-identified patent and that said Letters Patent are hereby corrected as shown below:

Column 3, line 18, "contains" should be --contain--.

Column 10, line 68, "acetonesaturated" should be --acetone-saturated--.

Column 17, line 39, in the Table under the heading "Solids", across from "acrylic acid", the figure "19.5" should be --119.5--.

Signed and Sealed this

Eighteenth Day of May 1982

[SEAL]

Attest:

*Attesting Officer*

GERALD J. MOSSINGHOFF

*Commissioner of Patents and Trademarks*